United States Patent [19]

Kwee

[11] Patent Number: 6,048,151

[45] Date of Patent: Apr. 11, 2000

[54] THREADED FASTENER

[76] Inventor: Kim Kwee, P.O. Box 379, Selden Post Office, Selden, N.Y. 11784-0379

[21] Appl. No.: 09/293,036

[22] Filed: Apr. 16, 1999

[51] Int. Cl.[7] .................................................. F16B 39/06
[52] U.S. Cl. ......................... 411/217; 411/220; 411/322; 411/948
[58] Field of Search ................................ 411/208, 217, 411/220, 321, 322, 323, 948

[56] References Cited

U.S. PATENT DOCUMENTS

| | | | |
|---|---|---|---|
| 232,369 | 9/1880 | Rukenbrod | 411/220 |
| 267,269 | 11/1882 | Smith et al. | 411/220 X |
| 346,440 | 7/1886 | Lutz | 411/217 |
| 1,564,700 | 12/1925 | McGlynn | 411/220 |
| 2,794,474 | 6/1957 | Stuckenborg | 411/217 |
| 4,645,394 | 2/1987 | While et al. | 411/217 X |

*Primary Examiner*—Neill Wilson

[57] ABSTRACT

A compressibly resilient strip is retainably disposed in an axial slot in a threaded shank which is advanced through a bore in a plurality of workpieces. A rigid retainer member is inserted into the slot to urge the resilient strip against the bore to increase the resistance force between bolt and bore against separation until such time as the retainer member is removed.

In another application of the invention, a threaded fastener having a head and a shank is inserted into a through opening in workpieces until the end protrudes and is fastened with a nut. An axial slot in the threaded fastener is aligned with an axial channel of the nut. A strip, having a protruding lug near its distal end, is passed through the slot of the threaded fastener until the protruding lug enters the channel of the threaded nut. The portion of the strip extending beyond the head of the threaded fastener is bent into a groove in the surface of the head of the threaded fastener, preventing accidental disassembly of fastener and nut.

11 Claims, 4 Drawing Sheets

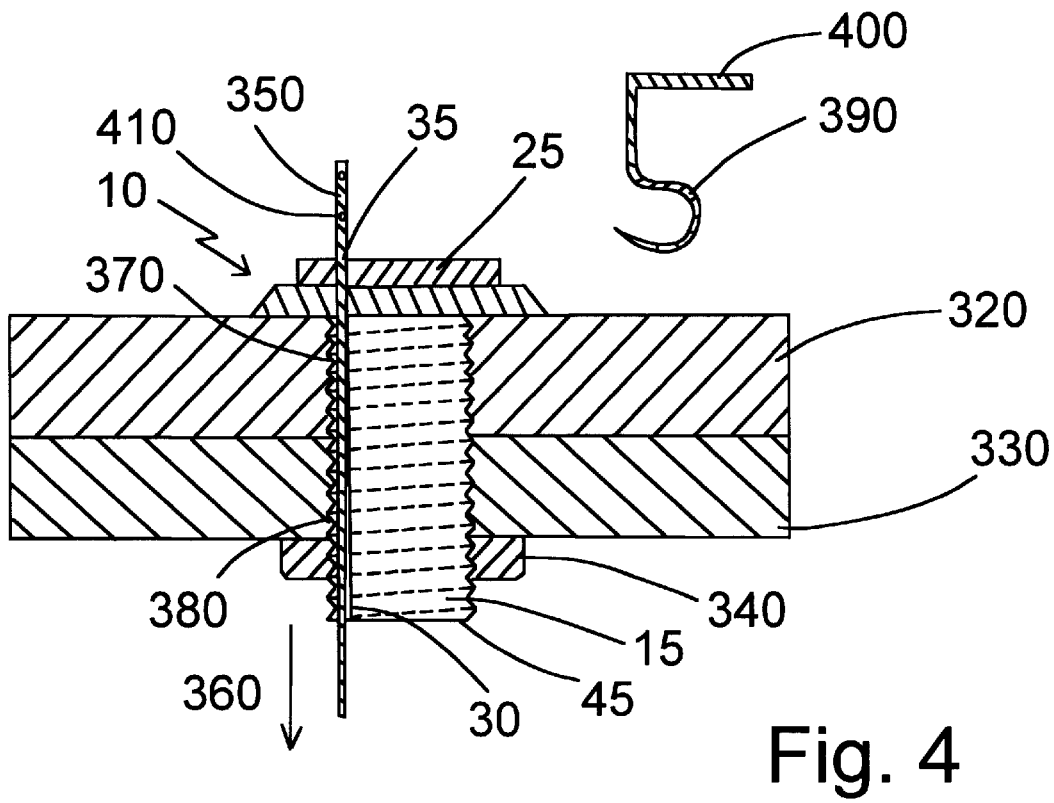
Fig. 4
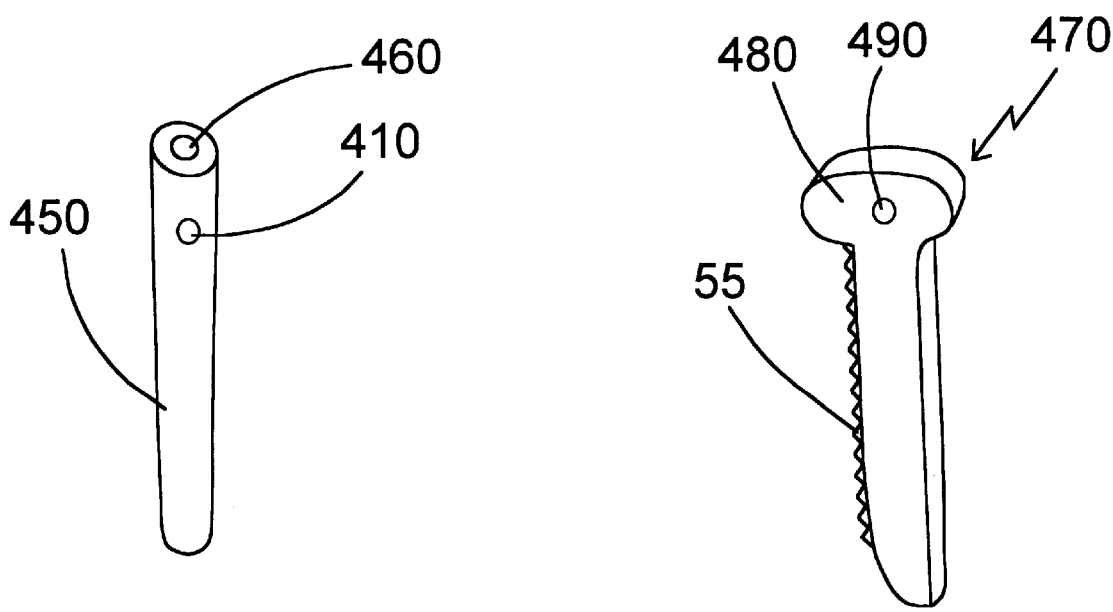
Fig. 5
Fig. 6

THREADED FASTENER

FIELD OF THE INVENTION

The invention relates generally to a threaded fastener of the type for fastening a plurality of workpieces and which can be removably secured without damage for reuse.

DESCRIPTION OF THE PRIOR ART

In U.S. Pat. No. RE 35,937 entitled "One-way nut and bolt", a bolt has a longitudinal channel along shank of the bolt. The nut has a corresponding longitudinal channel and includes a compressibly movable tine. The compressible tine has a distal end portion. The nut and the bolt cooperate to translate the nut along the bolt shaft via one-way rotation. In tightening the fastener with the nut, the tine is alternately flexed into the nut channel, by the action of the bolt threads, and released when the tine is disposed in the longitudinal channel. The presence of tine in the longitudinal channel prevents counter-rotational movement of the nut on the bolt when the distal end of the tine abuts the surface of the notches in the longitudinal channel. At location of excessive torque, the tine could remove itself from the bolt and permit separation of bolt and nut. The inventor proposes use of a special device to decompressing the tine for disassembly of bolt and nut.

In U.S. Pat. No. 5,842,822, entitled "Removable quasi-ratchet fastener", the shank of a fastener is resiliently compressible along an axis perpendicular to the shank push-in axis. The teeth are protruding from the shank along the axis of resilient compressibility. The teeth are inclined in the push-in direction. When the shank is pushed into an existing screw hole, then inclines of teeth just past the far side of the screw hole are increased to resist motion in the pull-out direction so that the shank is secured in the screw hole.

It is an object of the present invention to provide a fastener which can be used to securely fasten a plurality of workpieces together and which can be selectively disassembled without damage to the fastener components. Furthermore, this fastener can be economically produced and used with ease, and at the same time, preventing accidental disassembly of fastener and nut without undue labor and costs.

SUMMARY OF THE INVENTION

A compressibly resilient strip is retainably disposed in an axial slot in a threaded shank which is advanced through a bore in a plurality of workpieces. A rigid retainer member is inserted into the slot to urge the resilient strip against the bore to increase the resistance force between bolt and bore against separation until such time as the retainer member is removed.

In another embodiment of the invention, a strip having a protruding lug near an end is retainably and loosely disposed in an axial slot in the shank of a threaded fastener. The lug is aligned with a longitudinal channel extending across the threaded section of a threaded bore in a plurality of workpieces. A retaining pin is inserted into the slot, pressing and locking the lug of the strip into the longitudinal channel in the workpieces, thereby securing the fastener to the workpieces.

In a further embodiment of the invention, a threaded fastener having a head and a shank is inserted into a through opening in workpieces until the end protrudes and is fastened with a nut. An axial slot in the threaded fastener is aligned with an axial channel of the nut. A strip, having a protruding lug near its distal end, is passed through the slot of the threaded fastener until the protruding lug enters the channel of the threaded nut. The portion of the strip extending beyond the head of the threaded fastener is bent into a groove in the surface of the head of the threaded fastener. Excess strip material is removed.

BRIEF DESCRIPTION OF THE DRAWINGS

FIG. 4 is a simplified diagram of a second preferred embodiment of the invention using a flexible strip.

FIG. 5 is a simplified diagram of a flexible strip with a hollow body.

FIG. 6 is a simplified diagram of a retainer pin with a threaded section.

DESCRIPTION OF THE PREFERRED EMBODIMENTS

A better and more complete understanding of the practice of my invention may be had by reference to the following description when taken together with the accompanying drawings, wherein like reference symbols refer to like elements of the invention.

Figure 1:
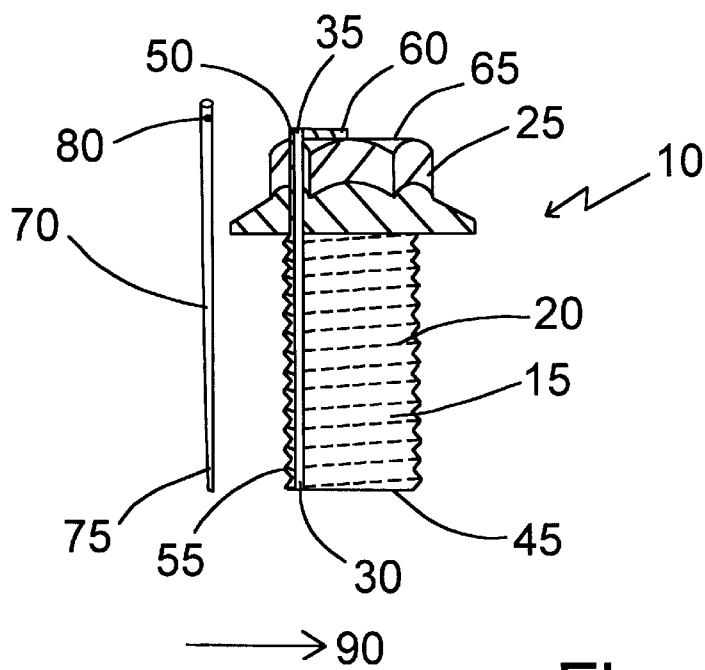
FIG. 1 is a simplified diagram of a first preferred embodiment of the invention, illustrating a threaded fastener with a resilient strip and a retainer pin.

Referring now to the first preferred embodiment of my invention shown in FIG. 1, wherein a threaded fastener 10, having an elongated shank 15 with a threaded section 20 and a hex head 25 comprises an axial slot 30, which is a longitudinal channel along shank 15 of fastener 10. Axial slot 30 is contiguous with a through opening 35 in head 25 and extends laterally along shank 15 to terminus 45. A deformable and compressible strip 50, comprising a flange 60 and a threaded section 55 of the same tilt and width as the threaded section 20 of threaded fastener 10, is retainably and loosely disposed in slot 30 with flange 60 abutting the outer surface 65 of head 25 of fastener 10. A rigid retainer pin 70, having a tapered end 75 at one end and an eye 80 near its other end, is inserted into slot 30 through the through opening 35, after the threaded fastener 10 has been advanced into a threaded hole (not shown). Threaded fastener 10, which is retainably disposed in the threaded hole, resists forces of extraction produced by the compressible nature of the strip 50 in the threaded hole against the rigid pin 70 in slot 30 in the radial direction transverse to the shank 15 as shown generally by the directional arrow 90.

The transverse resilient force in the direction 90 depends on the size and the shape of the rigid pin 70 relative to the size of the slot 30 and the compressibility coefficient of the strip 50.

Threaded fastener 10 can be unfastened easily, since rigid pin 70 is easily removable using a hook (not shown), to engage with eye 80 of pin 70 to lift pin 70 out of slot 30 and away from threaded fastener 10.

Figure 2:
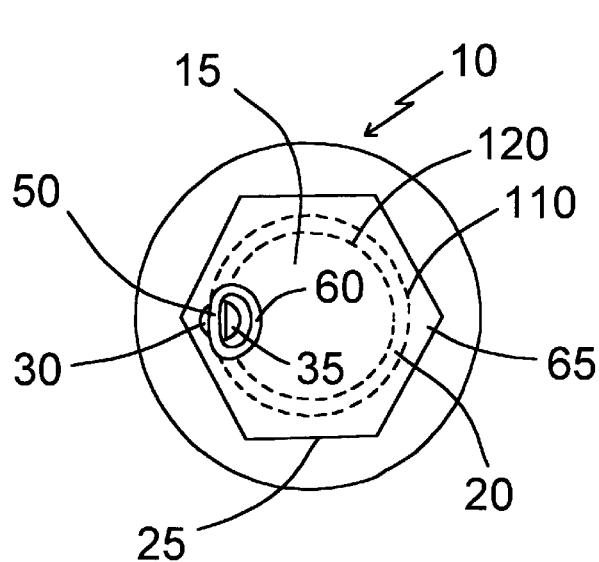
FIG. 2 is a plan view of the threaded fastener in FIG. 1.

Referring now to FIG. 2 which is a plan view of the fastener 10 of FIG. 1, the outer diameter of threaded section 20 of the threaded fastener 10 of FIG. 1 is denoted by an outer dotted circular line 110. The inner dotted circular line 120 represents the inner diameter of the threaded section 20 of FIG. 1. Flange 60 of the strip 50 covers part of the slot 30. The size of the flange 60 is larger than the through opening 35 in head 25, assuring that strip 50 is retainably disposed in the slot 30, when the rigid pin 70 of FIG. 1 is forcibly inserted into the slot 30 through the through opening 35, and flange 60 interacts with the top surface 65 of the head 25 of fastener 10.

Figure 3:
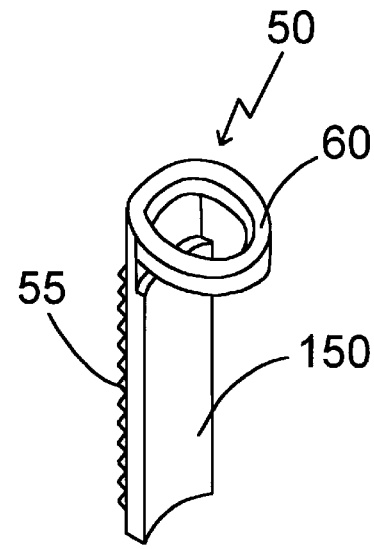
FIG. 3 is a simplified diagram of a compressible strip with a flange.

Referring now to FIG. 3 which shows a detailed drawing of a strip 50 of FIG. 1, strip 50 comprises a flange 60 and an arcuated body 150 including a threaded section 55. The thickness and the shape of the strip 50 can be chosen to generate suitable resilient force against the force of extraction of the threaded fastener 10 of FIG. 1 when used together with a pin 70 of FIG. 1, after the threaded fastener 10 has been fastened into a workpiece (not shown).

Referring now to FIG. 4, a second preferred embodiment of my invention showing a threaded fastener 10 for use in fastening a first workpiece 320 and a second workpiece 330 with a nut 340, a long tapered resilient strip 350 is forcibly inserted into an axial slot 30, which is a longitudinal channel along shank 15 of fastener 10. Axial slot 30 is contiguous with a through opening 35 in head 25 and extends laterally along shank 15 to terminus 45. Strip 350 is pulled downward through the slot 30, in the direction shown by the directional arrow 360, until a desirable resilient force generated by resilient strip 350 against threaded hole 370 in the first workpiece 320 and threaded hole 380 in the second workpiece 330 is achieved. Excess strip material 350 is removed. A hook 390 having a handle 400 is inserted into a one of the eyes 410 in the strip 350 to pull the strip 350 out from slot 30 and away from threaded fastener 10, enabling the threaded fastener 10 to be unfastened.

Referring now to FIG. 5 wherein a tapered compressible strip 450, having an axial through opening 460 and an eye 410, is used for insertion into the axial slot 30 of FIG. 4. Rigid pin 70 of FIG. 1 is inserted into the through opening 460 to increase the resistance force of extraction of the threaded fastener 10 from the workpiece 320 of FIG. 4.

Referring now to FIG. 6, a rigid pin 470 is used for insertion into the through opening 460 of FIG. 5. Rigid pin 470 having a head 480 comprises a threaded section 55 and an eye 490 for extraction by a hook 390 of FIG. 4. The threaded section 55 increases the resistance force of extraction of threaded fastener 10 from the workpiece 320 of FIG. 4.

Figure 7:
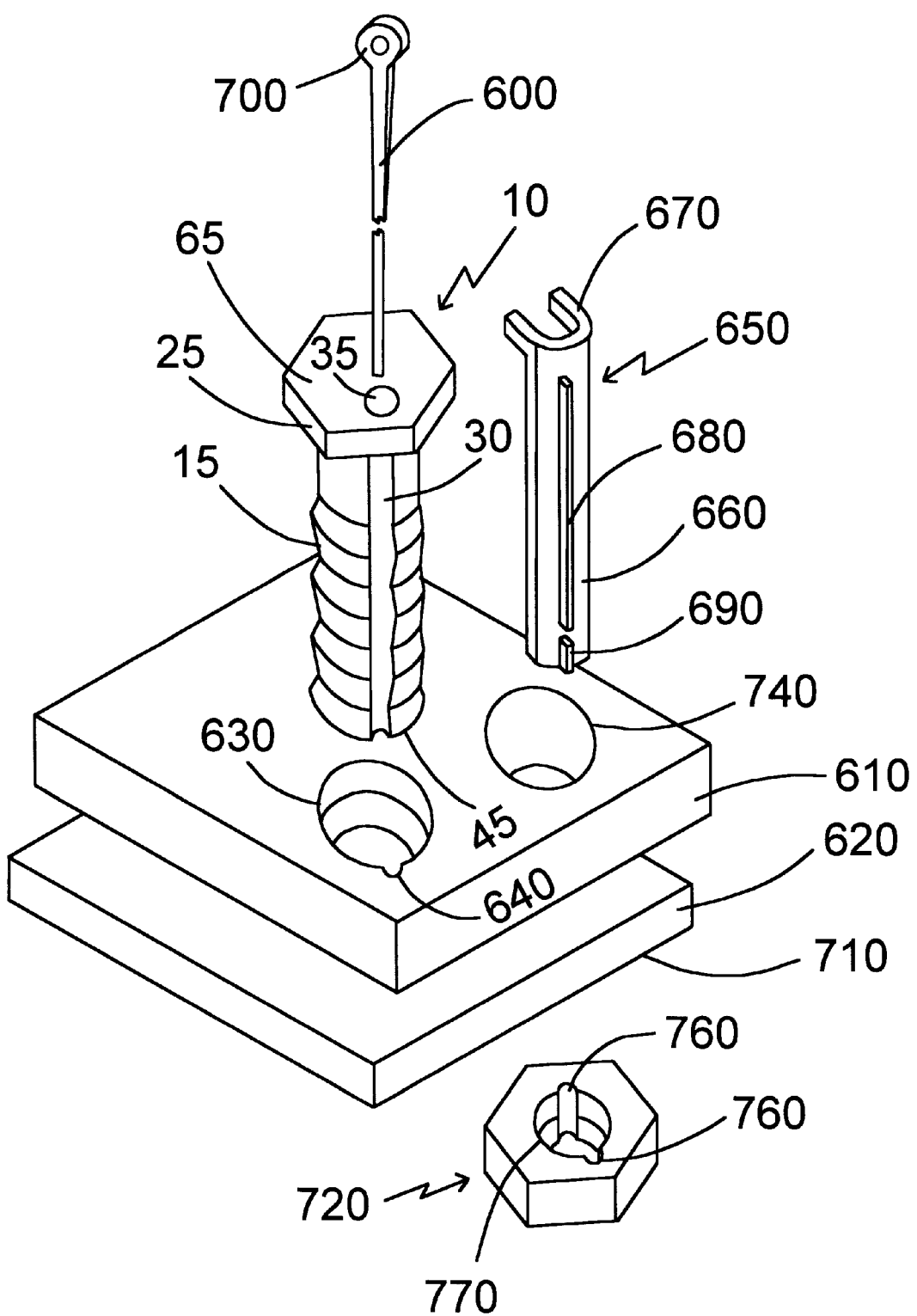
FIG. 7 is a simplified diagram of a third preferred embodiment of the invention showing a locking mechanism activated by a retainer pin.

Referring now to FIG. 7, a third preferred embodiment of my invention using a retainer pin 600 to lock a threaded fastener 10 to a first workpiece 610 and a second workpiece 620, wherein a threaded fastener 10 comprises an axial slot 30 along shank 15 contiguous with a through opening 35 in head 25 and extending laterally to a terminus 45. Threaded fastener 10 is advanced into a threaded bore 630 in the first workpiece 610 and a second workpiece 620. Threaded bore 630 comprises a longitudinal channel 640, extending axially in the threaded bore 630. Strip 650, shown disproportionately large in the drawing, is comparable in size to the axial slot 30 in which arcuated body 660 of strip 650 is to be retainably disposed. Strip 650 includes a flange 670. Lug 680 and lug 690 are protruding from arcuated body 660 of strip 650. Strip 650 is retainably and loosely disposed in slot 30 with the flange 670 in contact with the surface 65 of head 25 of fastener 10. After the threaded fastener 10 has been advanced into the threaded bore 630, the lug 680 of strip 650 is aligned with the longitudinal channel 640 of threaded bore 630. Retainer pin 600 having a head 700 is inserted into the through opening 35 in head 25, pressing the lug 680 into the axial slot 640 in the workpiece 610 and the workpiece 620, locking the threaded fastener 10 with the workpiece 610 and the workpiece 620, until such time as the retainer pin 600 is removed.

When a nut 720 is employed for fastening, the lug 680 of strip 650 is removed from strip 650, leaving only lug 690 protruding from strip 650. Threaded fastener 10, used together with the strip 650 which is retainably disposed in the slot 30 with flange 670 of strip 650 in contact with surface 65 of head 25, is retainably inserted into a through opening 740 in workpiece 610 and workpiece 620, until a portion of the shank 15 adjacent to terminus 45 protrudes beyond side 710 of workpiece 620. Nut 720, having a plurality of longitudinal channels 760 extending axially in the threaded through bore 770, is used to fasten the threaded fastener 10. Nut 720 is advanced along shank 15 of threaded fastener 10 until a one of the longitudinal channels 760 in nut 720 is aligned with slot 30 of threaded fastener 10. A retainer pin 600 is inserted into slot 30, pressing the lug 690 into the longitudinal channel 760 of nut 720, locking the threaded fastener 10 with the nut 720.

Figure 8:
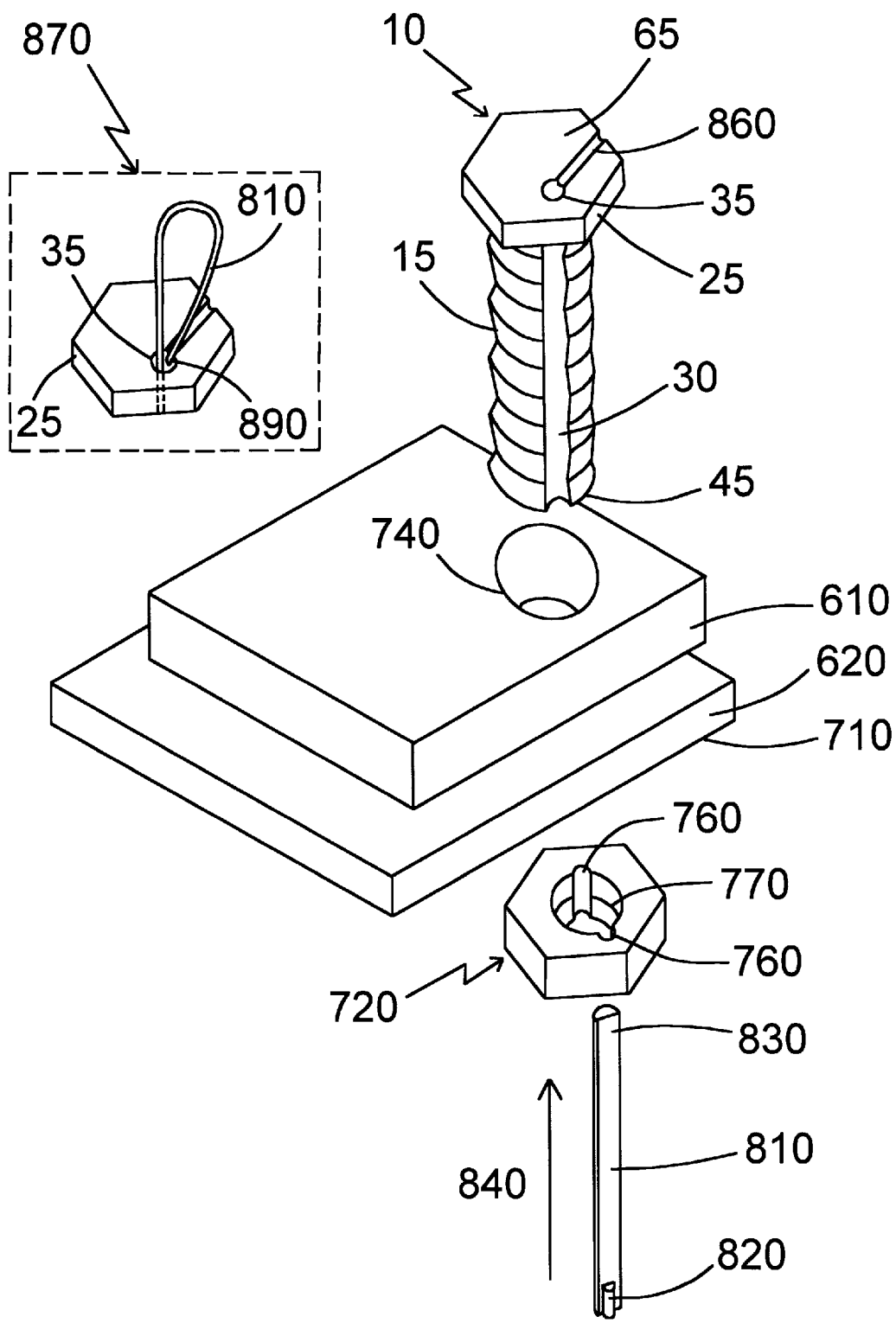
FIG. 8 is a simplified diagram of a fourth preferred embodiment of the invention showing a strip having a lug for engaging a threaded nut.

Referring now to FIG. 8, a fourth preferred embodiment of my invention using a threaded fastener 10 and a nut 720, wherein a threaded fastener 10 includes an axial slot 30 along shank 15 contiguous with a through opening 35 in head 25 and extending laterally to a terminus 45. Threaded fastener 10 is retainably inserted into through opening 740 in workpieces 610 and 620 until a portion of shank 15 adjacent to terminus 45 protrudes beyond side 710 of workpiece 620. Nut 720 having a plurality of longitudinal channels 760 extending axially in the bore 770 of nut 720, is used to fasten threaded fastener 10. Nut 720 is advanced along shank 15 of threaded fastener 10 until a one of the longitudinal channels 760 in nut 720 is aligned with slot 30 of threaded fastener 10. Strip 810, having lug 820 at the distal end and complimentary to the longitudinal channels 760 of nut 720, is inserted with end 830 of strip 810 entering longitudinal channel 760 of nut 720 in a direction as shown by directional arrow 840. Strip 810 is pushed further into slot 30 of threaded fastener 10 through the longitudinal channel 760 of nut 720, until the lug 820 of strip 810 has entered the longitudinal channel 760 of nut 720. The portion of strip 810 extending beyond through opening 35 in head 25 of threaded fastener 10 is bent into a groove 860 in the outer surface 65 of head 25, preventing accidental disassembly of threaded fastener 10 and threaded nut 720. Excess strip material 810 is removed; or, as illustrated in inset 870 of FIG. 8, a portion of strip 810 protruding from the through opening 35 can be bent inward to form a closed loop. End point 890 of strip 810 is inserted into through opening 35 in head 25 of fastener 10, securing the strip 810 to fastener 10.

Having described the invention and its preferred modes of operation in sufficient detail for those of normal skill in the art to practice the same, it will be obvious to such practitioners to make certain changes and variation in the specific elements of the disclosed embodiment without departing from the scope of the invention. For example, a rigid pin 470 may have features other than the threaded section 55 to increase the resistance force of extraction of the threaded fastener from the workpiece. A retainer pin 70 may be compressible in a direction transverse to the shank of threaded fastener for insertion of pin 70 into the axial slot of threaded fastener. A compressible strip may have other shapes and features to increase resistance force of extraction of the threaded fastener from the workpiece. It is also clear that a cotter pin may be used as a retainer member in place of the strip 810 to prevent accidental disassembly of fastener and nut.

For these reasons, the scope of the invention should not be limited by that which has been illustrated herein but should be limited only by the scope of the appended claims:

I claim:

1. A threaded fastener for removably securing a plurality of workpieces, said fastener comprising:

a head at one end of an elongated shank, said shank having a threaded section for retainable disposition in a through opening in said workpieces;

an axially extending slot in the surface of said shank, said slot extending the length of said shank and contiguous with an opening in said head;

a removably insertable strip extending the length of said slot; and, a retainer pin removably insertable in said slot to urge said strip outwardly away from said shank while pressing said strip against said through opening.

2. The invention of claim 1, which includes a nut having a plurality of longitudinally extending channels in the threaded bore of said nut and wherein said strip includes a protruding lug at an end thereof adapted to engagement with a one of said channels.

3. The invention of claim 1, wherein insertion of said retainer pin into said slot causes said strip to deform to press away from said shank while pressing said strip against said through opening and removal of said retainer pin permits said strip to deform to permit disassembly of said fastener from said workpieces.

4. The invention of claim 1, wherein said strip includes an arcuated body having a threaded section.

5. The invention of claim 1, wherein said strip includes a flange member in contact with the surface of said head.

6. A threaded fastener for removably securing a plurality of workpieces, said fastener comprising:

a head at one end of an elongated shank, said shank having a threaded section for retainable disposition in a through bore in said workpieces;

an axially extending slot in the surface of said shank, said slot extending the length of said shank and contiguous with an opening in said head; and, a removably insertable strip extending the length of said slot and having a protruding lug at an end thereof.

7. The invention of claim 6, wherein said fastener includes a nut having a plurality of longitudinally extending channels in the threaded bore of said nut, said lug adapted to passage into a one of said channels for engaging with said nut, a portion of said strip extending beyond said head being bent into contact with the outer surface of said head.

8. The invention of claim 7, wherein said fastener includes a groove in said outer surface of said head adapted to receive said portion of said strip.

9. The invention of claim 6, wherein said bore having an inner threaded section and an axially extending channel, said fastener includes a removably retainer pin insertable in said slot to urge said lug into said channel in said bore, with said strip having a flange member in contact with outer surface of said head.

10. A threaded fastener for removably securing a plurality of workpieces, said fastener comprising:

a head at one end of an elongated shank, said shank having a threaded section for retainable disposition in a through opening in said workpieces;

an axially extending slot in the surface of said shank, said slot extending the length of said shank and contiguous with an opening in said head;

a removably insertable strip extending the length of said slot and having a protruding lug at an end thereof; and, a threaded nut having a plurality of longitudinally extending channels in the threaded bore of said nut, said lug adapted to passage into a one of said channels for engaging with said nut, a portion of said strip extending beyond said head being bent into contact with the outer surface of said head.

11. The invention of claim 10, wherein said fastener includes a groove in said outer surface of said head adapted to receive said portion of said strip.

* * * * *